G. E. WILSON.
HOSE COUPLING.
APPLICATION FILED APR. 4, 1913.

1,113,080. Patented Oct. 6, 1914.

Witnesses

Inventor
Glen E. Wilson
By Victor J. Evans
Attorney

UNITED STATES PATENT OFFICE.

GLEN E. WILSON, OF EAST LIVERPOOL, OHIO.

HOSE-COUPLING.

1,113,080.  Specification of Letters Patent.  Patented Oct. 6, 1914.

Application filed April 4, 1913. Serial No. 758,875.

*To all whom it may concern:*

Be it known that I, GLEN E. WILSON, a citizen of the United States, residing at East Liverpool, in the county of Columbiana and State of Ohio, have invented new and useful Improvements in Hose-Couplings, of which the following is a specification.

This invention relates to hose couplings, and particularly to couplings for use in connecting a flexible hose to the nipple or nozzle of a valve structure; and it has for its object the provision of a device of this character which includes mating and coöperating clamping elements which are mounted for swinging movements on the nozzle of the valve structure and which are associated with a constricting or actuating means whereby when the means are actuated the companion clamping elements will be made to operatively engage against the hose and thereby positively retain the same in connected position upon the nozzle.

With the above and other objects in view, the invention consists of certain novel features of construction, combination and arrangement of parts, as will be hereinafter described and claimed.

Figure 1:
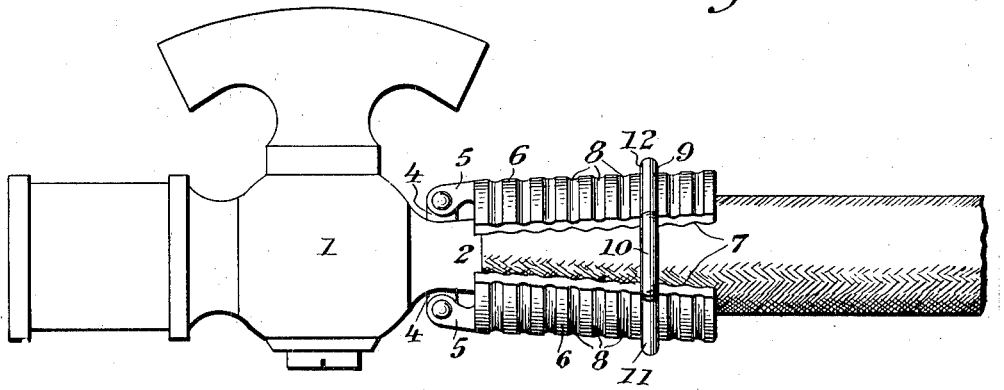
Figure 2:
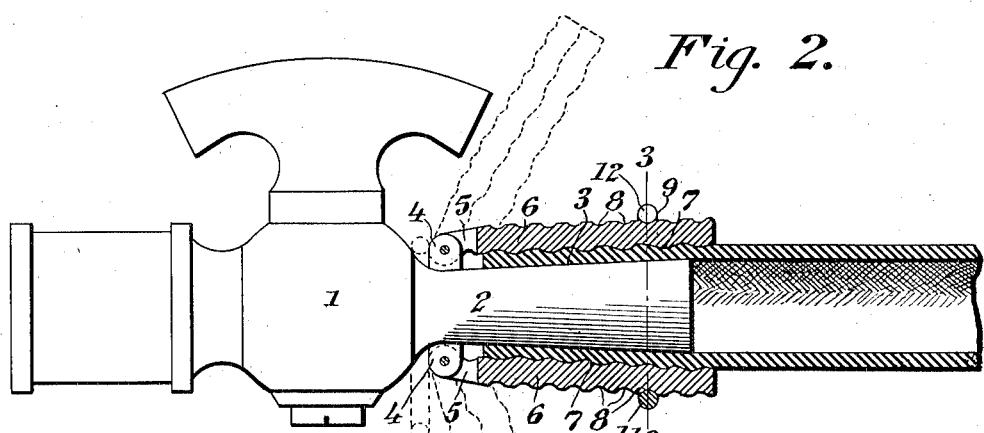
Figure 3:
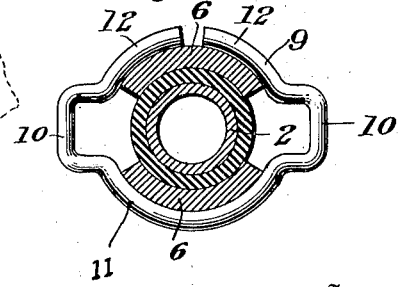
Figure 4:
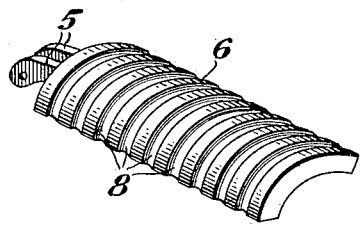

In the accompanying drawings:—Figure 1 is a side view of a valve structure, showing the application of the coupling thereto; Fig. 2 is a vertical longitudinal section through the coupling, showing the valve structure in side elevation; Fig. 3 is a section on line 3—3 of Fig. 2; and Fig. 4 is a perspective view of one of the clamping elements.

The valve structure 1 conventionally illustrated herein includes a discharge nozzle 2 having relatively flared external walls 3. In other words it is described that the nozzle is of increased external diameter toward its outer end. The said nozzle is provided with fixed brackets or posts 4, which are pivotally connected with lugs 5 of companion clamping elements 6. These elements are of identical formation and each is provided with inner corrugations 7 and outer annular grooves 8, the grooves of one of the elements being alined with the grooves of the other element for a purpose to be hereinafter explained. The elements are substantially of semi-circular configuration in transverse section and each is of an increased thickness toward its outer end.

An actuating device 9 is preferably constructed of a single length of wire and provided with diametrically disposed offset hand-gripping extensions 10, which are connected by an integral arcuate portion 11 and relatively separated and springy arcuate portions 12. The portions 11 and 12 are constructed with a view to engaging interchangeably and successively in the external grooves of the clamping elements 6. The constricting device is designed to slide freely upon both of the elements 6 and when moved in the direction of the outer ends of the elements, the portions 11 and 12, which are yieldable, will be engaged in the external grooves of said element 6 and thereby hold the elements in proper confined positions against the adjacent terminal of the hose. It is evident that the greater the adjustment of the clamping device in the direction of the outer ends of the element 6, the greater the construction of the hose against the nozzle 3 of the valve structure. It is also described that the constricting device is adapted to be adjusted entirely across the integral post 4 of the nozzle 3 and to rest on one side of the post so as to permit the element 6 to be adjusted to the dotted line position shown in Fig. 2 of the drawing. The nozzle 3 is then entirely exposed so as to facilitate the connection of the hose therewith or the removal of the same therefrom.

In order that the hose may be freely removed from the nozzle, when desired, I preferably construct the actuating device 9 with such regard to the posts 4 that said device may be moved over said posts and arranged at one side thereof as shown in dotted lines in Fig. 2 and suspended directly from the inner end of the nozzle 2. This enables one to adjust the gripping elements 6 to the dotted positions shown in Fig. 2, where they are spaced from each other for a considerable distance relatively and to thereby permit the operator to freely pass his hand over the nozzle and between said elements 6 and to effectually grasp the hose and remove the same from said nozzle.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

In a hose clamp, the combination with a member having a nozzle extending therefrom, said nozzle being of a restricted diameter toward its inner end and of circular configuration in transverse section, and brackets extending laterally from the nozzle adjacent the inner end thereof, of gripping devices pivoted at their inner ends to said brackets and movable with relation to said nozzle and spaced from each other along their longitudinal edges, and adjusting means movably mounted on said devices and having lateral manipulating portions disposed outwardly of the spaces between said devices, and adapted to be adjusted over the said brackets and to lie directly at one side thereof and suspended directly from the nozzle beyond the points of pivotal connection of the gripping devices with said brackets when it is desired to release the devices from the hose.

In testimony whereof I affix my signature in presence of two witnesses.

GLEN E. WILSON.

Witnesses:
HARRY OLIVER,
ALFRED T. MOORE.